United States Patent
Stetzler

[15] 3,702,970
[45] Nov. 14, 1972

[54] SYSTEM AND METHOD FOR DETERMINING THE MAXIMUM OUTPUT VOLTAGE SWING ON OPERATIONAL AMPLIFIERS

[72] Inventor: Grant F. Stetzler, Temple, Pa.

[73] Assignee: Western Electric Company, Incorporated, New York, N.Y.

[22] Filed: Feb. 24, 1971

[21] Appl. No.: 118,409

[52] U.S. Cl. ..................330/2, 330/9, 330/100, 330/69, 330/112, 324/57
[51] Int. Cl. ...............................H03r 19/00
[58] Field of Search.............330/112, 9, 100, 85, 2; 324/57; 325/486

[56] References Cited

UNITED STATES PATENTS 3,582,675  6/1971  Jordon, Jr. et al. ........330/9 X
3,496,407  2/1970  Entermann ..................315/27
2,506,365  5/1950  Knight .....................330/112 X Primary Examiner—Nathan Kaufman
Attorney—W. M. Kain and R. P. Miller

[57] ABSTRACT

An operational amplifier is rapidly driven through a voltage swing to a maximum value; that is, the excursion of the output voltage attains a maximum value with a prescribed difference between the input and the output voltages. Initially, a voltage equal to the prescribed voltage is fed through an adder feedback circuit to the input of the amplifier and the resulting output voltage is added to the initial voltage to initiate a regenerative build up of the voltage applied to the input. The output voltage instantaneously increases until the prescribed difference exists between the input and the output voltages. A reading of this voltage indicates the maximum voltage swing at the prescribed difference between the input and output voltages.

4 Claims, 2 Drawing Figures

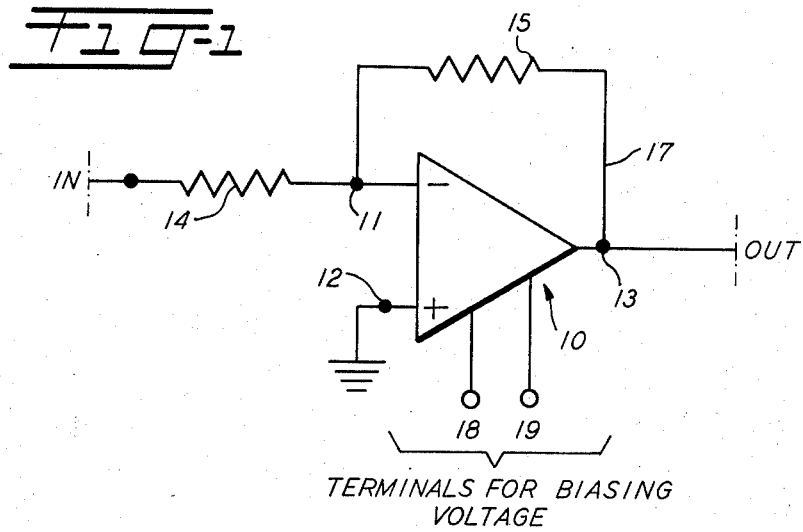
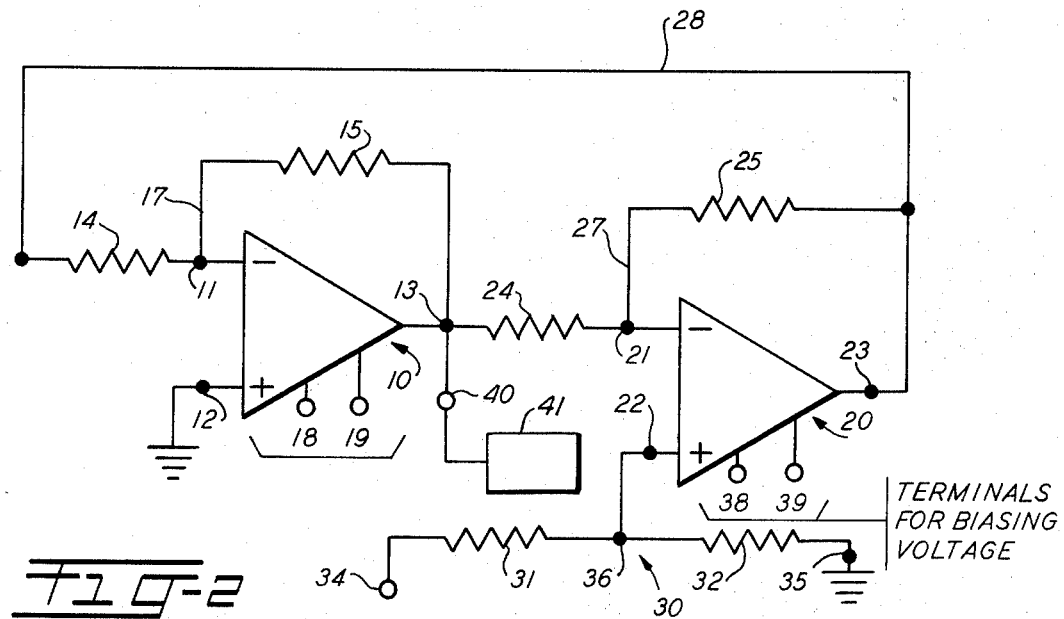

SYSTEM AND METHOD FOR DETERMINING THE MAXIMUM OUTPUT VOLTAGE SWING ON OPERATIONAL AMPLIFIERS

BACKGROUND OF THE INVENTION

1. Field of the Invention

This invention relates to systems and methods for determining the maximum output voltage swing on operational amplifiers, and more specifically, to systems and methods wherein a constant voltage is initially applied to an operational amplifier under test and the resultant output is added to the constant voltage to initiate a regenerative action to drive the operational amplifier to a measurable maximum output voltage with a prescribed difference between the input and output voltages of the operational amplifier.

2. Description of the Prior Art

High volume production of integrated circuit operational amplifiers requires a method of quickly determining the operating characteristics of the amplifiers. Factors contributing to the wide usage of operational amplifiers are the multitude of functions, e.g., summation, inversion, integration, and differentiation, which operational amplifiers may perform depending upon the characteristics of the input and feedback impedances. This versatility has resulted in an increasingly wide application of operational amplifiers to fields such as computer technology and telephony. However, commensurate with increased usage is the need for correspondingly efficient methods of determining the operational amplifier's operating characteristics.

One such characteristic is the maximum output voltage swing, that is, the maximum value of the output voltage corresponding to a specified amount of non-linearity or difference between input and output voltages which occurs with the onset of saturation. A possible method for determining the maximum output voltage swing would comprise overdriving the amplifier under test with an input larger than necessary for saturation. However, such a procedure would render difficult the determination of the maximum output at a specified difference in input and output voltages, and internal biasing under overdrive conditions might result in an output voltage that is lower than the available maximum.

Another test sequence comprises measuring and comparing the values of voltage input and output when the input is initiated at some value below that necessary for the expected output and then increased incrementally. Here, using program storage to initiate and control the incremented applications of test voltages, an excessive time is required for testing, particularly if bipolar testing is required and if more than one bias voltage is to be used. Also, even with the use of a test device having program storage, the possibly numerous incremental steps may require excessive storage facilities.

It may be thus appreciated that there is a need for a test system which quickly determines the maximum output voltage on operational amplifiers for a prescribed difference between the input and output voltages.

SUMMARY OF THE INVENTION

The present invention contemplates systems and methods for automatically driving an operational amplifier through a voltage swing to a maximum output, and for efficiently monitoring the maximum output voltage at a specified difference or non-linearity between input and output voltages.

In view of the aforementioned fact that the maximum output voltage swing is determined at a specified difference in input and output voltages, the invention further contemplates systems and methods for presetting the specified difference as a voltage and then utilizing this voltage in a regenerative feedback system for driving an operational amplifier to the maximum output voltage swing with the difference in input and output voltages corresponding to the preset difference in voltages.

More particularly, the invention may take the form of a feedback adder system which is interposed between the output and input terminals of the operational amplifier under test. The adding function of the feedback system may be provided by a second operational amplifier. Initially, a constant voltage is applied to the second operational amplifier to generate an output having the value of the specified voltage difference. This voltage is fed by the feedback system as input to the amplifier under test and the resulting output is added by the second operational amplifier to the output generated by the applied constant voltage, initiating a regenerative increase in the voltage applied to the amplifier under test and driving the amplifier under test through its maximum output voltage swing. A voltage measuring or recording device connected to the output of the amplifier under test gives a reading of the maximum voltage output at the specified difference in input and output voltages.

BRIEF DESCRIPTION OF THE DRAWINGS

FIG. 1 is a simplified schematic representation of an operational amplifier which is to be driven to saturation by a system which embodies the principles of this invention; and FIG. 2 is a simplified schematic representation of an embodiment of a system which may be used to practice the principles of this invention and to drive an operational amplifier to a maximum voltage swing with a prescribed difference between the input and output voltages.

DETAILED DESCRIPTION

Referring to FIG. 1, there is shown in schematic form a conventional operational amplifier of the type which may be tested by the systems and methods of the present invention, designated generally by the numeral 10 and having input terminals 11 and 12 and an output terminal 13. The internal circuitry of the amplifier is such that the polarity of signals applied to terminal 11 is inverted by the amplifier and impressed on the output terminal. Signals applied to terminal 12 pass through the amplifier without inversion of polarity. A feedback loop 17 containing a resistor 15 connects the output terminal 13 to the input terminal 11 to hold the output terminal at zero potential during non-operating periods. The gain of amplifier 10 may have a multitude of values, depending upon the ratio of the relative values of feedback resistor 15 and input resistor 14. For purposes of explanation, resistors 15 and 14 are equal-valued, so that amplifier 10 is configured as a unity gain amplifier and signals applied to terminal 11 pass through the amplifier with substantially no change in magnitude.

In the use of these amplifiers, there is a maximum voltage swing which may be utilized before the drop in voltage through the amplifier becomes excessive, that is, there is a drift away from the linear relationship between the input and output voltages. In utilization of such amplifiers in computing, telephone or other control systems, the amplifier must produce an output that is linearly related, within limits, to the input. Otherwise, the resulting output voltage is erroneous or non-predictable and cannot be used to accomplish the desired system functions.

Referring now to FIG. 2, there is shown an embodiment of the present invention wherein the operational amplifier 10 is connected in a feedback adder system for driving the operational amplifier towards saturation, and through a voltage swing wherein the driving action ceases upon occurrence of a predetermined difference between the input and output voltages.

A principal feature of this system is a second operational amplifier 20, hereinafter referred to as the "feedback amplifier," utilized as a voltage adder. The amplifier 20, which may be of a type such as Philbrick P65 or P65AU or Fairchild A741C, has a conventional configuration somewhat similar to that of amplifier 10, i.e., terminals 21 and 22 for inverting and non-inverting inputs, respectively, an output terminal 23, an input resistor 24 in series with inverting input terminal 21, and a feedback loop 27 containing a resistor 25 which connects the output terminal 23 to the inverting input terminal 21. Resistors 24 and 25 are of equal value, configuring amplifier 20 as a unity gain amplifier with respect to inverting input terminal 21. This operational amplifier 20 performs an adding function in that a voltage which is present at terminal 13 is inverted by amplifier 20 and added to a voltage that is generated by an input voltage impressed on terminal 22.

The output terminal 23 of the feedback amplifier 20 is coupled to the inverting input terminal 11 of amplifier 10 through a feedback loop 28 and the input resistor 14. Also, the output terminal 13 of amplifier 10 is connected to the inverting input terminal 21 of feedback amplifier 20 through the input resistor 24.

As mentioned previously, in the configuration shown in FIGS. 1 and 2, the input and feedback resistors 14 and 15 of amplifier 10 are of equal value, e.g., 100K, and resistors 24 and 25 associated with amplifier 20 are also of equal value, e.g., 10K. These amplifiers are therefore configured as unity gain inverters with respect to signals applied to terminals 11 or 21, and are connected in a feedback circuit running from the output terminal 23 of the amplifier 20, over the feedback loop 28, the resistor 14, the input 11 of amplifier 10, the output 13 of amplifier 10, and the resistor 24 connected to the input terminal 21 of the amplifier 20. It will be noted that a signal impressed over this feedback circuit is inverted by the amplifier 10 and then inverted back to the original polarity by the functioning of the second operational amplifier 20.

As is characteristic of operational amplifiers, the gain associated with non-inverting input terminal 22 of amplifier 20 is twice that for inverting input terminal 21. Since amplifier 20 is configured as a unity gain amplifier with respect to inverting input terminal 21 in the present instance, an input voltage applied to non-inverting terminal 22 generates an output voltage of the same polarity, and of substantially twice the magnitude, as the input voltage.

The non-inverting input 22 of the feedback amplifier may be connected to a voltage divider network, designated generally by the numeral 30, comprised of resistors 31 and 32 and terminals 34, 35, and 36. When a small constant voltage is applied to terminal 34, a part of that voltage, as determined by the values of the network resistors, is applied through junction terminal 36 to the input terminal 22.

In view of the gain of 2 associated with input terminal 22, it is convenient to use resistors 31 and 32 that are equal-valued, e.g., 10K, so that the value of the voltage applied to the input terminal 22 through terminal 36 is one-half the value of the voltage applied to terminal 34. Thus, in response to the voltage applied to terminal 22, the feedback amplifier 20 generates an output voltage of the same polarity, and of substantially the same magnitude, as the input voltage to terminal 34. This output voltage is applied through feedback loop 28 as input to amplifier 10. The amplifier 10 inverts the input voltage and the resulting output voltage is impressed upon and inverted by the feedback amplifier 20 to the same polarity as the polarity of the constant voltage applied to the terminal 34. The feedback amplifier 20 combines or adds this inverted output with the constant voltage applied to terminal 34, triggering a regenerative action which cumulatively increases the input to amplifier 10 and drives that amplifier toward saturation. This regenerative action will continue until the drop in voltage across the amplifier 10 is equal to the voltage added at terminal 34. In this situation, the amplifying section of the operational amplifier 20 associated with the input terminal 21 no longer applies an increasing voltage to be added to the constant voltage applied to the terminal 34, and the regenerative cycling is disrupted and the system is stabilized.

Proper operation of the system requires that the amplifier 10 saturate before the feedback amplifier 20. One method of ensuring this is to use higher bias voltages for the feedback amplifier than for the amplifier 10. A typical arrangement of bias voltages is shown in FIG. 2, where pins designated 38 and 39 supply, e.g., +15 and −15v bias, respectively, to the feedback amplifier. The relatively lower biasing level for amplifier 10 is supplied by terminals 18 and 19; the exact value is determined by the specification for the particular amplifier 10 under test.

It should be noted that the present invention permits testing in both the positive and negative modes. Thus, application of a positive constant voltage to terminal 22 of amplifier 20 generates a negative output in amplifier 10. Similarly, if a negative voltage is applied to terminal 22, a positive output is generated.

In utilizing the aforementioned system to measure the maximum output voltage swing, with predetermined limits of variation between the input and output voltages, a typical test specification might require that the output of amplifier 10 exceeds ±5.6v when that amplifier is biased at ±6.2v and the absolute value of the difference between input and output voltages does not exceed 0.3v. What is required is that the difference between input and output as applied to terminal 34 be equal to 0.3v and the measured output voltage exceed 5.6v for the 6.2v biasing level. Thus, measurement of the value of the input voltage to amplifier 10 is not required. As shown in FIG. 2, a terminal 40 is provided for connecting a device 41 to measure and/or record the value of the output voltage. A reading of this output voltage at stabilization gives the value of the maximum output voltage swing, i.e., the maximum output voltage for the specified 0.3v difference in input and output.

Considering a typical operation under the above-outlined test specification, application of +.3v to terminal 34 results in the application of +.15v to input terminal 22 of amplifier 20. Then +.3v appears on the output terminal 23 and is impressed over the feedback loop 28 to the input terminal 11 of amplifier 10. Amplifier 10 functions to invert the voltage and apply −.3v on the output terminal 13, whereupon this voltage is impressed through resistor 24 to the input terminal 21 of amplifier 20. Amplifier 20 thereupon inverts and adds this voltage to the .3v voltage generated by the .15v voltage impressed on input terminal 22. This action is instantaneous and initiates the repetitive action of adding voltages generated by the input voltage impressed on the terminal 22 to the inverted output voltages of amplifier 10 and applying the added voltages over the feedback loop to the input terminal 11 of amplifier 10. This regenerative action continues until there is a .3v drop in voltage impressed through the amplifier 10. At this time, the regenerative feedback action is just adding .3v, which is equal to the drop across the amplifier. Thus, the voltage swing impressed on the input terminal 11 ceases, and a reading may be taken at terminal 13 to give the maximum voltage swing with the prescribed .3v variation in input and output voltages on the amplifier 10.

The system may be used to measure the amplifier response to negative voltages by merely changing the polarity of the voltage supplied to the terminal 34. Further, the system may be used to test other than unity gain amplifiers, in which case the voltage applied to terminal 34 will have to be related to the amplification characteristics of the amplifier so as to provide absolute readings that are meaningful.

It is to be understood that the above-identified embodiments are simply illustrative of the principles of the invention and numerous other modifications may be devised without departing from the spirit and scope of the invention.

What is claimed is:

1. A system for determining the maximum output voltage of a first operational amplifier upon the occurrence of a specified voltage difference between input and output voltages thereof; wherein the first operational amplifier has an inverting input terminal and an output terminal, which comprises:

a second operational amplifier having an inverting input terminal, a non-inverting input terminal, and an output terminal;

means for applying a voltage to said non-inverting input terminal of said second operational amplifier so that a voltage equal to the specified voltage difference is developed at said output terminal of said second operational amplifier;

means for coupling said output terminal of said second operational amplifier to the inverting input terminal of the first operational amplifier;

means for coupling the output terminal of the first operational amplifier to said inverting input terminal of said second operational amplifier so that the output voltage of the first operational amplifier is added to the specified voltage difference developed at said output terminal of said second operational amplifier thereby initiating a regenerative feedback action to continuously increase the voltage applied to the inverting input terminal of the first operational amplifier until the voltage difference between the inverting input terminal and the output terminal of the first operational amplifier is equal to the specified voltage difference; and means coupled to the output terminal of the first operational amplifier for measuring the output voltage of the first operational amplifier to determine the maximum output voltage upon the occurrence of the specified voltage difference.

2. A system for determining the maximum output voltage of a first operational amplifier as set forth in claim 1 wherein said applying means further comprises a voltage divider network having a junction coupled to said non-inverting input terminal of said second operational amplifier and having an input terminal so that applying a voltage equal to the specified voltage difference to said input terminal of said network produces an output voltage from said second operational amplifier equal to the specified voltage difference.

3. In a system for determining the maximum output voltage of a first operational amplifier which is obtainable without exceeding a predetermined voltage drop between an inverting input terminal and an output terminal of the first operational amplifier;

a second operational amplifier having an inverting input terminal, a non-inverting input terminal and an output terminal, the output terminal of the first operational amplifier being coupled to said inverting input terminal of said second operational amplifier;

a voltage divider network coupled to said non-inverting input of said second operational amplifier and having an input terminal, so that applying a preselected voltage equal to the predetermined voltage drop to said input terminal of said voltage divider network produces a voltage at said output terminal of said second operational amplifier equal to the predetermined voltage drop solely in response to the applying of said preselected voltage;

means for coupling said output terminal of said second operational amplifier to the inverting input terminal of the first operational amplifier so that a regenerative feedback action is established to drive the first operational amplifier toward saturation, said regenerative action automatically ceasing when the voltage drop between the inverting input terminal and the output terminal of the first operational amplifier equals said preselected voltage; and means coupled to the output terminal of the first operational amplifier for measuring the output voltage to determine when said regenerative feedback action has ceased thereby determining the maximum output voltage from the first operational amplifier corresponding to a predetermined voltage drop between the inverting input terminal and the output terminal.

4. A method of determining the maximum output voltage of an operational amplifier corresponding to a specified voltage difference between input and output voltages, wherein the first operational amplifier has an inverting input terminal and an output terminal, which comprises:

introducing a voltage equal to the specified voltage difference into a regenerative feedback circuit coupling the output terminal to the input terminal of the operational amplifier;

increasing the voltage applied to the input terminal of the operational amplifier by said regenerative feedback circuit in steps equal to the sum of the specified voltage difference and the voltage present at the output terminal of the operational amplifier;

stabilizing the voltage applied to the input terminal when the voltage drop between the input terminal and the output terminal equals the specified voltage difference; and measuring the output voltage of the operational amplifier to determine when said applied voltage is stabilized thereby determining the maximum output voltage of the operational amplifier corresponding to the specified voltage difference between input and output voltages.

* * * * *